US011474938B2

(12) United States Patent
Shveidel et al.

(10) Patent No.: US 11,474,938 B2
(45) Date of Patent: Oct. 18, 2022

(54) DATA STORAGE SYSTEM WITH MULTIPLE-SIZE OBJECT ALLOCATOR FOR DISK CACHE (71) Applicant: EMC IP Holding Company LLC, Hopkinton, MA (US)

(72) Inventors: Vladimir Shveidel, Pardes-Hana (IL); Geng Han, Beijing (CN); Haiyun Bao, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/151,413

(22) Filed: Jan. 18, 2021

(65) Prior Publication Data

US 2022/0229777 A1 Jul. 21, 2022

(51) Int. Cl.
*G06F 12/06* (2006.01)
(52) U.S. Cl.
CPC .... *G06F 12/0646* (2013.01); *G06F 2212/608* (2013.01)
(58) Field of Classification Search
None
See application file for complete search history.

(56) References Cited

U.S. PATENT DOCUMENTS

| | | | | |
|---|---|---|---|---|
| 6,249,852 B1* | 6/2001 | Benayon | ............... | G06F 12/023 711/170 |
| 6,442,661 B1* | 8/2002 | Dreszer | ................ | G06F 12/023 711/170 |
| 8,793,463 B2 | 7/2014 | Moss et al. | | |
| 9,454,473 B2 | 9/2016 | Luan et al. | | |
| 9,575,678 B2 | 2/2017 | Miller et al. | | |
| 2005/0071597 A1* | 3/2005 | Lee | ........................ | G06F 12/023 711/170 |
| 2006/0085433 A1* | 4/2006 | Bacon | ................. | G06F 12/0253 |
| 2007/0234296 A1* | 10/2007 | Zorn | .................... | G06F 11/1494 717/124 |
| 2009/0276602 A1* | 11/2009 | Chedru | ................. | G06F 12/023 711/170 |
| 2012/0166725 A1* | 6/2012 | Soran | ..................... | G06F 3/0608 711/114 |
| 2014/0282589 A1* | 9/2014 | Kuang | .................. | G06F 9/5016 718/104 |
| 2016/0292071 A1 | 10/2016 | Varma | | |
| 2017/0351606 A1* | 12/2017 | Chakrabarti | ............ | G06F 16/00 |
| 2018/0157827 A1* | 6/2018 | Kang | ..................... | G06F 12/14 |

\* cited by examiner

*Primary Examiner* — William E. Baughman
(74) *Attorney, Agent, or Firm* — BainwoodHuang (57) ABSTRACT

Managing pool memory in a data storage system includes maintaining free lists for corresponding object sizes. For a memory-consuming request (e.g., host write) an allocation operation is performed and the request data is stored. The allocation operation includes (1) selecting a memory object at least as large as the request size and removing all pages of the selected memory object from the corresponding free list, and (2) selecting pages of the selected memory object to store the request data and marking the selected pages as non-free, and leaving any leftover pages as free pages. For a memory-freeing request (e.g., destaging), a deallocation operation is performed that includes (1) marking the request pages free, and (2) based on neighboring pages being free, merging the request pages and neighboring pages into a corresponding memory object and adding the merged pages to the corresponding free list.

20 Claims, 6 Drawing Sheets

DATA STORAGE SYSTEM WITH MULTIPLE-SIZE OBJECT ALLOCATOR FOR DISK CACHE

BACKGROUND

The present invention relates to the field of data storage systems, and in particular to data storage systems employing disk caches conventionally realized in semiconductor memory.

SUMMARY

A method of managing pool memory in a data storage system includes maintaining a set of free lists for a corresponding set of object sizes in the pool memory, wherein the object sizes are corresponding distinct multiples of a fixed page size. Each free list identifies corresponding free pages available to store data.

In response to a memory-consuming request (such as a host write) having a request size, an allocation operation is performed and the request data is stored. The allocation operation includes (1) selecting a memory object of a size at least as large as the request size and removing all pages of the selected memory object from the corresponding free list, and (2) selecting sufficient pages of the selected memory object to store the request data and marking the selected pages as non-free, and leaving any leftover pages of the selected memory object as free pages. In some embodiments, these free pages may be linked to a lower-level object list so that they can be allocated for subsequent requests.

In response to a memory-freeing request (such as a destaging operation that writes data out to underlying storage), a deallocation operation is performed that includes (1) marking the request pages free, and (2) based on sufficient neighboring pages being free, merging the request pages and neighboring pages into a corresponding memory object and adding the merged pages to the corresponding free list. In some embodiments, if merging is not possible then the request pages may be left free and not linked to any object list, so that they are available for a separate future merging operation.

The disclosed technique can be performed efficiently and synchronously with the associated requests, so that memory space is used efficiently and there is reduced need for any separate reclaiming/merging or defragmentation processes for example. Additionally, the technique can be coupled with a partitioning technique to increase lock granularity and reduce lock contention, further improving operation through enhanced parallelism.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

In a data storage system a disk cache may be realized using a page buffer pool. It is necessary to use an allocator to manage the page resources in the pool. Some known approaches may have characteristics and drawbacks such as the following:

1. There is only a single lock contention domain, and thus intensive locking contention on the allocator.
2. Memory space is evenly assigned to each of multiple CPU cores. However, in an asymmetric model in which the cores have different types of processing loads, resources for some of the cores might be exhausted, while other cores might still have plenty of resources. Therefore, this can result in inefficient use of memory resources.
3. In some schemes it is necessary to use complicated tree-type data structures (e.g., AVL trees) to track used and freed fragments in order to support defragmentation. Updating and rebalancing the tree can be expensive in terms of processing needs.
4. The IO pattern could be dynamically changed, but the allocation technique might not be able to adapt in a manner to maximize efficiency.

The disclosed technique can address some/all of the above challenges, in particular with characteristics/operations such as the following:

1. A randomizing of N cores to M partitions to minimize lock contention and reduce wasted space in asymmetric processing.
2. Allocating pages from the a preferred object list and moving leftover pages to a lower level object list for separate use (less space waste)
3. Merges are done at the time of freeing pages and take place at the zone object level (lightweight defragmentation, no separate background defragmentation process needed)
4. The share of different object sizes can be dynamically adapted to the real-time I/O and allocation pattern.
5. Allocation/free is done efficiently, requiring only a short critical section (spinlock), and the complexity is O(1) regardless of the pool size.

DESCRIPTION OF EMBODIMENTS

Figure 1:
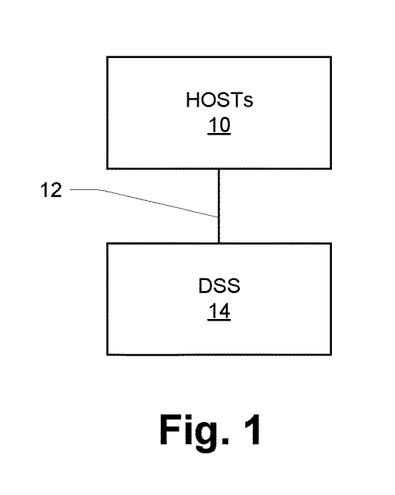
FIG. 1 is a block diagram of a data processing system.

FIG. 1 is a simplified depiction of a data processing system in relevant part. It includes host computers (hosts) 10 functionally connected by interconnect 12 to a data storage system (DSS) 14. In a typical case, a host 10 is a server type of computer providing computing services to separate clients, such as database services, transaction services, virtual-computing services, etc., as generally known. A typical computer includes one or more processors, memory (volatile and non-volatile), and I/O interface circuitry, connected together by one or more data buses. The data storage system 14 is typically a purpose-built hardware device providing a variety of services related to secondary storage, as generally known in the art and as also outlined below. The interconnect 12 is typically provided by one or more networks, including any of a wide-area network (WAN), local-area network (LAN) and storage-area network (SAN).

Figure 2:
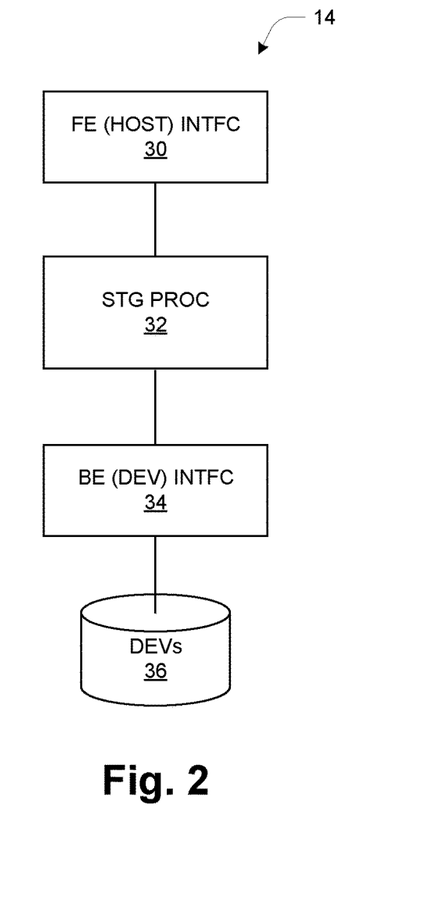
FIG. 2 is a block diagram of a data storage system from a hardware perspective.
Figure 3:
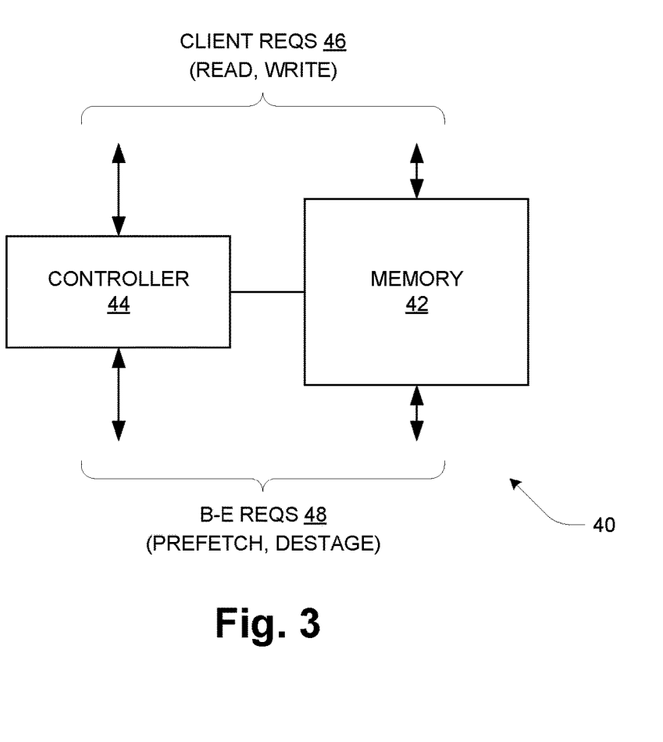
FIG. 3 is a block diagram of a disk cache realized in a data storage system.

FIGS. 2 and 3 illustrate the DSS 14 from a hardware and software perspective respectively. As shown in FIG. 2, at a hardware level the DSS 14 includes a front-end (FE) or host interface 30, storage processing (STG PROC) circuitry 32, a back-end (BE) or device interface 34, and physical storage devices (DEVs) 36 (which may be realized in any of a variety of forms including magnetic and sold-state, for example). The FE interface 30 provides an interface to the host-facing interconnect 12 (FIG. 1), while the BE interface 34 provides an interface to the physical devices 36, employing FibreChannel® or similar storage-oriented connection functionality. The storage processing circuitry 32 executes software that provides a variety of functions including disk cache functionality as described in more detail below.

FIG. 3 is a high-level depiction of a disk cache 40, realized as part of the storage processing 32 of FIG. 2. It includes a large memory 42 and a controller 44. In operation, the disk cache 40 services client requests 46 for reading and writing data, as well as back-end requests 48 related to prefetching and destaging of data from/to the devices 36. The client requests 46 are generated by functional components (not shown) that operate to carry out storage requests as received from the hosts 10. Although such functional components may be quite complex, in general they are known, and from the perspective of the disk cache 14 they are simply sources of data storage requests (reads and writes), as described more below, and thus they are not elaborated further. Similarly, there are functional components involved with prefetching data from devices 36 for storage into the disk cache 40, and for pushing data from the disk cache 40 out to the devices 36, a process known as "destaging"; these are likewise not elaborated further.

It should be noted that while the improvements are disclosed herein in relation to a disk cache 40 in particular, those skilled in the art will appreciate that the techniques may be applicable to other types of memory/storage systems. Also, the memory 42 for a disk cache may be volatile or non-volatile.

Figure 4:
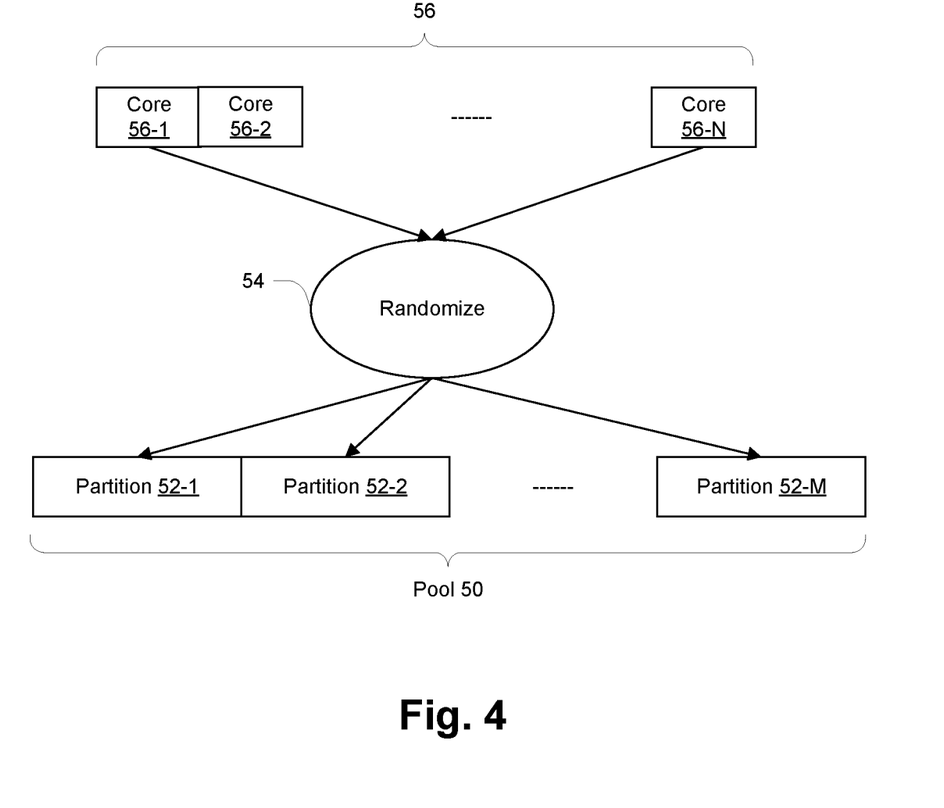
FIG. 4 is a schematic diagram of a memory partitioning scheme for reducing lock contention and supporting asymmetric processing model.

FIG. 4 illustrates a first aspect of the disk cache 40 of FIG. 3, namely a scheme for reducing lock contention and improving parallelism in operation. The memory 42 is shown as a pool 50 which is partitioned into a number of distinct regions or partitions 52, shown as partitions 52-1, . . . , 52-M. This is a logical partitioning created by the controller 44 for purposes of having multiple separate contention domains, i.e., having multiple regions or domains that can be locked for access independently, which enhances parallelism. During operation, the controller 44 regularly performs a randomizer function 54 to randomly distribute allocation requests from processing cores 56 (shown as 56-1, . . . , 56-N, part of the storage processing circuitry 32) among the partitions 52. This feature can enhance operating efficiency especially when an asymmetric processing model is employed across the cores 56 as described above—usage of the partitions 52 is equalized notwithstanding that the different cores 56 may have much different memory loading characteristics. In one example, partitioning may be done in general proportion to the number of cores 56, e.g., M≈N/2.

Figure 5:
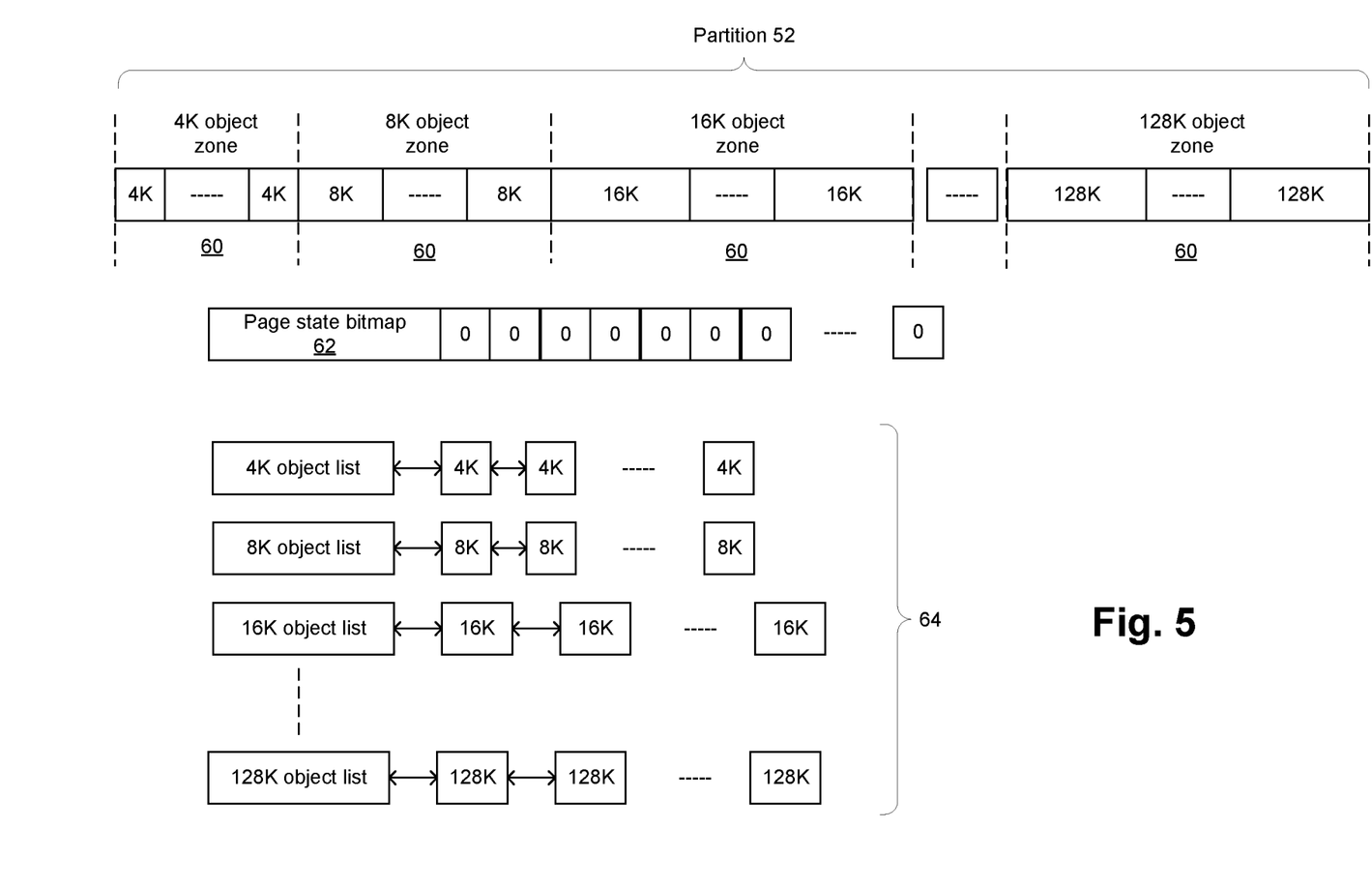
FIG. 5 is a schematic diagram of structure used in connection with allocation of disk cache memory.

FIG. 5 illustrates certain structure employed by the controller 44 in conjunction with its function of controlling use of the memory 42 for storing data, i.e., allocation and deallocation of memory space in response to requests and operating conditions. At the top of FIG. 5 is shown the structuring of a single partition 52 into different zones 60 for different-size data objects. In the present context an object is a unit of allocation, as described further herein. The smallest unit of allocation is a single page, which in the illustrated example has a size of 4 KB and is shown as "4K". The object sizes are power-of-2 multiples of the page size, e.g., 4K, 8K, 16K, . . . as shown. In this example the largest object size is 128 K, i.e., 32 pages. In operation, there will be an initial configuration for the respective sizes of the zones 60, which may relate generally to an expected pattern of sizes of I/O requests to be satisfied by the disk cache 40. As a trivial example, if it is assumed that there is a uniform distribution of access sizes, then the zones 60 may be of equal size initially (e.g., each of six zones 60 having a size equal to ⅙ of the partition 52 in the example of FIG. 5). More realistically some non-uniform distribution may be expected, and the zones are sized accordingly.

Also shown in FIG. 5 is a page state bitmap 62 used to track free/allocated state of memory the memory pages, and a set of free lists 64 for the different zones 60. In the illustrated example the free lists 64 are realized as doubly-linked lists, each having a respective head and tail at any given moment. Different-sized free objects are linked into the respective linked lists 64. The linked lists 64 are used to track free objects, and thus are also referred to as "free object lists" 64. Each list 64 (and thus object size zone 60) has its own lock for resolving concurrent contending accesses. In the illustrated embodiment, the structure of FIG. 5 is repeated for each partition 52, so that lock contention has two-dimensional granularity, i.e., first to a partition 52 and then to an object list 64 for that partition 52. Within a partition 52, there may be concurrent accesses across the lists 64, and this concurrency extends across the partitions 52, based on the randomization 54 as described above.

It is also noted that based on the sharing configuration of the zones 60 and the page address for a page of interest, the location of that page within a given zone object can be determined.

Figure 6:
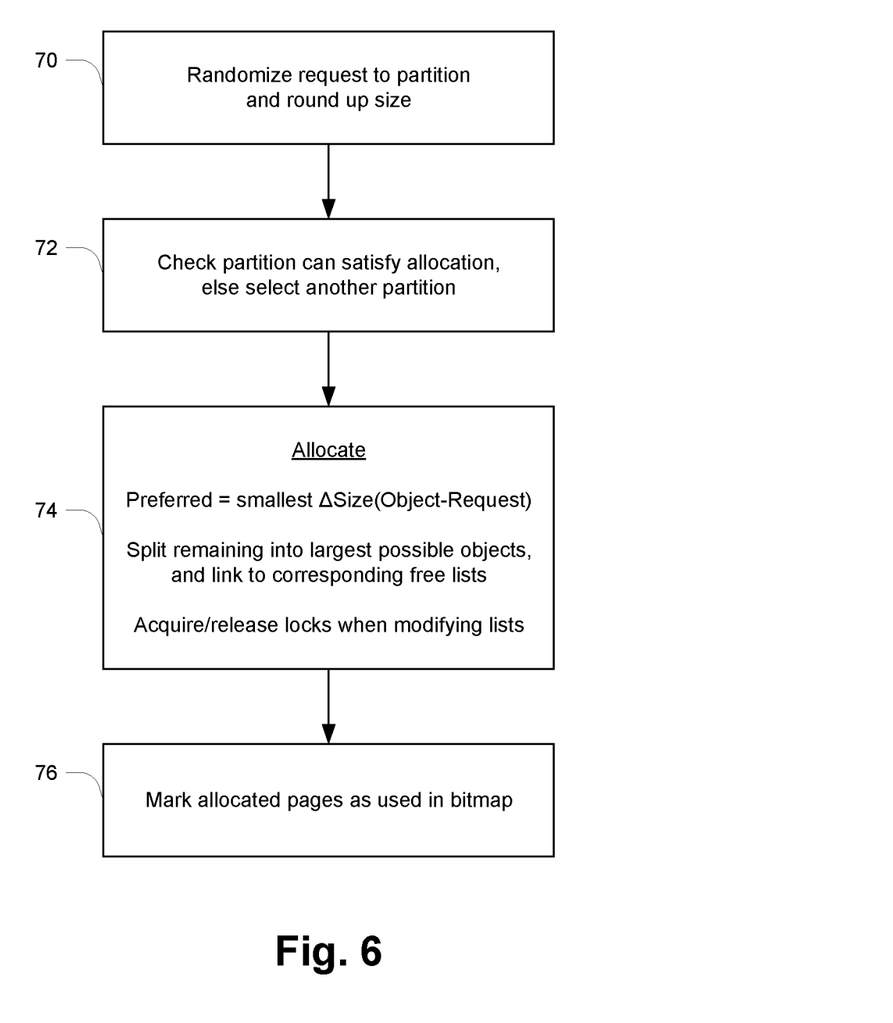
FIG. 6 is a flow diagram of allocation operation.

FIG. 6 shows operation in connection with a new allocation, such as in response to a client write request that requires allocation of an area of the memory 42 to store the data being written. This is also referred to as a "memory consuming" request. The operation is performed by the memory controller 44 using the structure shown in FIG. 5.

At 70, the request is randomized to a partition 52 and the size of the request is rounded up to the next page boundary. Thus if the request size is 11 KB for example (i.e., a write of 11 KB of data), then the request size is rounded up to the next page boundary of 12 K. It will be noted that the rounding is to a page boundary and not necessarily to an object boundary.

At 72, the controller 44 checks whether the partition identified at 70 can satisfy the allocation request, by determining whether there is at least one free object at least as large as needed. In one implementation, this can be realized by continually maintaining an identification of the largest-object-size list 64 that is non-empty, and comparing the request size with this object size. Continuing with the above example, if any of the lists 64 for 16K or larger objects are non-empty, then this comparison will yield a positive indication. If this check is satisfied, then processing will continue at 74 for the current partition 52, and otherwise another partition 52 may be selected (using round-robin selection, for example) and the process re-started from 72. If the test fails for all partitions 52, then the request will be failed as having encountered a memory full condition, which might trigger a destage or other operation to free memory space.

At 74, the controller 44 performs an allocation operation to allocate an object for the request. Multiple steps are involved as shown. First, a preferred object list 64 is selected, which is a non-empty list 64 whose object size is closest to the request size. This is shown more formally at 74 as the "smallest ΔSize(Object-Request)". Continuing with the above example of a 12K rounded request size, the preferred object list will be the 16K object list if non-empty, because the difference (16K-12K) is smallest among all candidate lists 64. This step may examine successively larger lists until it finds one that is non-empty (which is guaranteed based on the check at 72). Once a list 64 is selected, an object is allocated from the head of that list 64.

Continuing with the allocation at 74, the next step is to split off any remaining or leftover pages of the allocated object for reassignment to other list(s) 60, thus making them available for allocation for subsequent requests. Continuing with the example of an 11K rounded request using a 16K object, the first three 4K pages will be allocated to the request and the 4$^{th}$ page will be a leftover page, and it is added to the end (tail) of the 4K free object list 64. From there, the page may later become allocated as a 4K object, or it may be merged into a larger object upon a later deallocation as described below. It will be appreciated that in the case that the rounded request size exactly matches an allocated object size, no splitting is necessary (e.g., if a request of rounded size 8K is being satisfied using an 8K object).

When splitting the leftover pages, the new generated objects should be as large as possible to limit fragmentation. As an example, when using a 32K object to satisfy a 20K rounded request size, the three leftover pages (12K total) are preferably used to make one 8K object first (using two pages) and then one 4K object (with the single remaining page). The pages for each new object are added to the corresponding list 64. Another way of describing this operation is that the leftover pages are incorporated into new objects of successively smaller sizes as they are being added to the lower-order free lists.

Also noted at 74 is that a lock is acquired and released only when modifying (adding or removing objects) from the corresponding list 64. The lists 64 can be checked (read) without requiring a lock.

Finally, at 76 the pages that have been allocated to store the request data are marked as used (not free) in the bitmap 62.

Regarding the locks, it is noted that each partition 52 is a contention domain. But instead of having a single lock for the entire partition 52, there are a set of locks for the corresponding lists 64. All the checking (e.g. whether the list is empty) is done without taking the lock. The lock can be acquired just immediately before removing an object from a list. If the operation fails in case the list is empty at the time when removing the object, the search and check operation can simply be repeated. This kind of optimistic approach can make critical-section code very small, improving execution efficiency. Also, regarding the bitmap 62, no spin lock is needed—the bit can be set with an atomic primitive. Thus, object allocation can be done efficiently with very low lock contention. And its complexity is O(1) regardless of the pool size.

Additionally, in alternative embodiments a leftover page may not necessarily be linked to another list, at least not right away. There are several possible approaches which have pluses and minuses and may depend on operating circumstances:

1. Keep it free and hidden from allocation (i.e., unlinked). Pros: it is definitely available for merging back into a large object when the other part is free. Cons: Less usable total blocks.
2. Keep it free and allocate as soon as possible, hoping that the two parts will be released and merged together not too much time later. Pros: if the release pattern follows a first-allocate-first-release manner in some degree, then this can work well. Cons: The later merge is not ensured. It may be desirable to keep released pages un-allocatable for a while when it cannot be merged immediately.
3. Keep it free and allocate it much later, hoping that the allocated part will be released before the free page is allocated. Pros: if the system is not in heavy load, it can work well. Cons: in heavy load this makes the merge probability even smaller.

Figure 7:
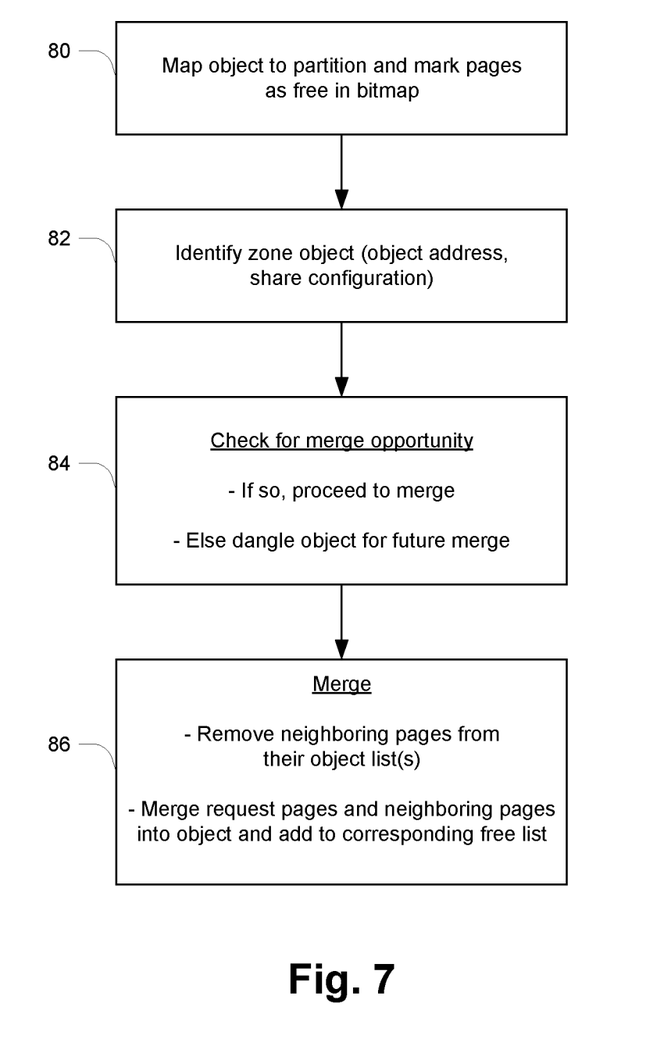
FIG. 7 is a flow diagram of deallocation operation.

FIG. 7 shows operation in connection with a new deallocation, such as in response to a destaging operation in which stored data is written out to a device 36, whereupon the occupied memory is no longer needed for that data and can be free for other uses. This is also referred to as a "memory freeing" request. The operation is performed by memory controller 44 using the structure shown in FIG. 5.

At 80, the freed pages are mapped to a corresponding object and its partition 52, and the pages are marked as free in the bitmap 62.

At 82, the zone object for the freed pages is identified through the object address and current share configuration. Here the object address identifies where in the partition 52 the object resides, and the zone is identified by noting the object location relative to the current zone boundaries (which may be dynamic, as described further below).

At 84, there is a check for an opportunity to merge pages into an object, by looking at neighboring pages to determine if there is an object-size set of pages made up of the request pages (i.e., the pages freed by this request) and neighboring pages. If so, then a merge operation will occur, as described further below. Otherwise, the request pages may be "dangled", i.e., left in free state but not linked an object list 64. In this state, the request pages are free for a later merge operation, and are unavailable for allocation. Because such dangling effectively makes pages unavailable for use, there may be a separate mechanism for monitoring the extent of dangling and enforcing a limit. An alternative to dangling, which could be used always or only once a dangling limit has been reached, is to link the freed pages to one or more lower-level object lists 64, at the risk of increasing fragmentation.

At 86 is the merge operation. The free neighboring pages that are linked to lower-level object lists 64, if any, are removed from those lists. Then the request pages and the neighboring pages are merged into a corresponding object, which is then added to the corresponding free object list. In this respect it is noted that in removing the neighbor pages from the lower level object list, it is not necessary to go through the entire list 64 to find out the pages. Each page will have an associated page descriptor, with their being a "1 to 1" mapping between the page and the descriptor. The index of the page descriptor in a page descriptors array is equal to the index of the page in the pool 50. Thus, the page descriptor can be located easily using the page ID.

Similar to the split operation at 74, it will be appreciated that at 86, in the case that a memory-freeing request size exactly matches an allocated object size, no merging may be necessary or desired (e.g., if a request has a large rounded size such as 32K that exactly matches an object size, and there is no need or desire to merge into larger objects).

Overall, the deallocation operation of FIG. 7 is also very efficient, with very low lock contention. And the complexity is O(1) as well, regardless of the pool size.

Figure 8:
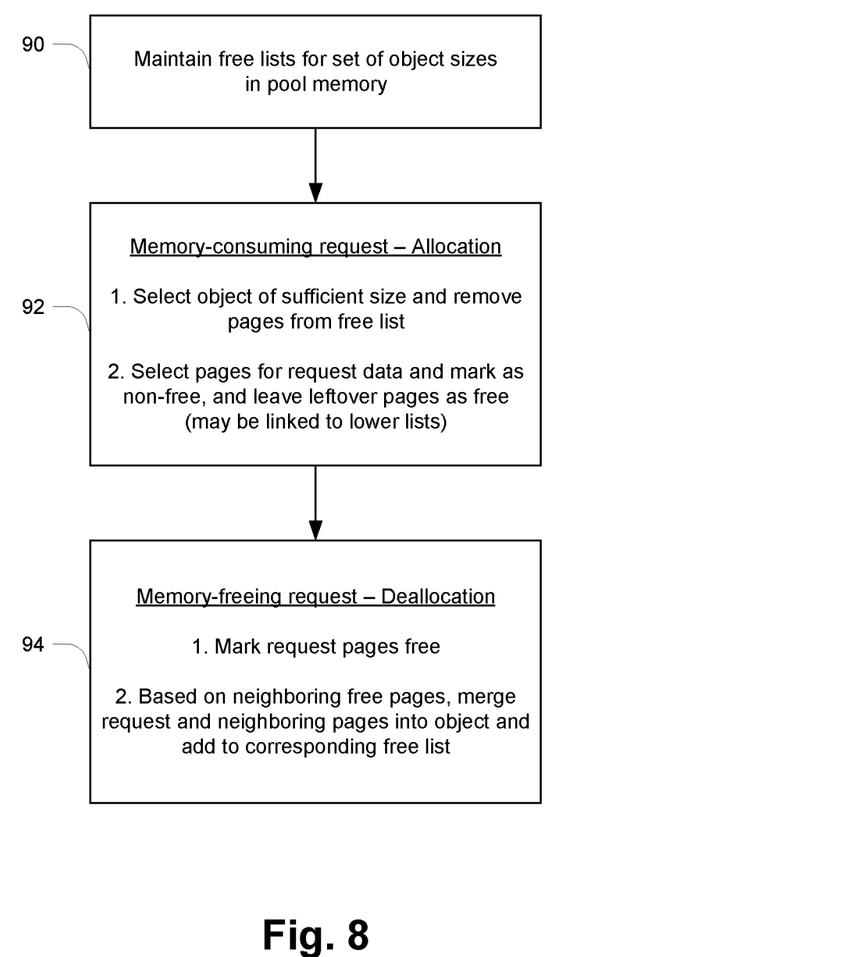
FIG. 8 is a flow diagram for overall summary operation.

FIG. 8 presents a slightly higher-level summary of operation in pertinent part.

At 90, a set of free lists is maintained for a corresponding set of object sizes in the pool memory. The object sizes are corresponding distinct multiples of a fixed page size (e.g., 4K, 8K, etc.), and each free list identifies corresponding free pages available to store data. In one embodiment, there may actually be multiple sets of free lists, distributed across respective partitions of the pool. But in general the allocation technique can be used independently of partitioning.

At 92, in response to a memory-consuming request (e.g., a write) having a request size, an allocation operation is performed and the request data is stored. The allocation operation includes (1) selecting a memory object of a size at least as large as the request size and removing all pages of the selected memory object from the corresponding free list, and (2) selecting sufficient pages of the selected memory object to store the request data and marking the selected pages as non-free, and leaving any leftover pages of the selected memory object as free pages. As described above, it will typically be desirable to link the free pages to lower-level lists so that they are available for allocation for other request, but in some embodiments they may be left dangling for a later merge operation.

At 94, in response to a memory-freeing request (e.g., a destage), a deallocation operation is performed that includes (1) marking the request pages free, and (2) based on sufficient neighboring pages being free, merging the request pages and neighboring pages into a corresponding memory object and adding the merged pages to the corresponding free list. As described above, if there is no merge opportunity, then the pages may be dangled or perhaps added to a lower-level list.

Dynamic object size share adaptation In a real system the pattern of host I/O, which will result in a corresponding allocation pattern, could change dynamically. In order to reduce the splitting and merging of objects, it may be desirable to dynamically adjust the objects' shares, i.e., the relative sizes of the zones 60. The controller 44 may track the number of requests of different sizes in some time intervals (e.g. T seconds). Based on the statistics, the objects' share sizes can be reconfigured in each of the time windows (T seconds). Therefore, the share of different object sizes could follow the real-time allocation pattern.

After the object share is reconfigured, an allocated object might move from one zone to another. For example, an object may belong to object zone A at the time of allocating, but it may belong to object zone B when releasing. The merged zone objects will be linked to the object list based on the latest the share configuration. As an example, pages in one 8K object belong to the 8 k object zone 60 upon allocation, but after reconfiguring, the pages become part of the 4K object zone. In this case, when releasing the 8K object, it is broken into two 4 k zone objects and these are linked to the 4K object list 64.

While various embodiments of the invention have been particularly shown and described, it will be understood by those skilled in the art that various changes in form and details may be made therein without departing from the scope of the invention as defined by the appended claims.

What is claimed is:

1. A method of managing pool memory in a data storage system, the pool memory including an array of pages of a fixed page size, the method comprising:
   maintaining a set of free lists for a corresponding set of object sizes in the pool memory, the object sizes being corresponding distinct multiples of the fixed page size, each free list identifying corresponding free pages available to store data for memory objects of the corresponding object size;
   in response to a memory-consuming request having a request size, performing an allocation operation and storing request data, the allocation operation including (1) selecting a memory object of a size at least as large as the request size and removing all pages of the selected memory object from the corresponding free list, and (2) selecting sufficient pages of the selected memory object to store the request data and marking the selected pages as non-free, and leaving any leftover pages of the selected memory object as free pages; and
   in response to a memory-freeing request, performing a deallocation operation including (1) marking the request pages free, and (2) based on sufficient neighboring pages being free, merging the request pages and neighboring pages into a corresponding memory object and adding the merged pages to the corresponding free list.

2. The method of claim 1, further including, in the allocation operation, adding the leftover pages to one or more of lower-order free lists for object sizes smaller than the selected memory object, thereby making the pages available for subsequent allocation.

3. The method of claim 2, wherein the leftover pages are added to the lower-order free lists in a manner making new objects as large as possible to reduce fragmentation, such that pages are incorporated into new objects of successively smaller sizes as they are being added to the lower-order free lists.

4. The method of claim 2, further including, in the deallocation operation, checking whether free neighboring pages are linked to corresponding free lists, and if so then unlinking them from the free lists before merging them into the memory object.

5. The method of claim 1, further including, in the deallocation operation, checking whether free neighboring pages are linked to corresponding free lists, and if so then unlinking them from the free lists before merging them into the memory object.

6. The method of claim 5, further including, in the allocation operation, adding the leftover pages to one or more of lower-order free lists for object sizes smaller than the selected memory object, thereby making the pages available for subsequent allocation.

7. The method of claim 1, further including, in the deallocation operation based on insufficient neighboring pages being free, leaving the request pages unlinked into any free list, thereby making them available as free pages for a future merge with other neighboring pages when freed.

8. The method of claim 1, further including, in the deallocation operation based on insufficient neighboring pages being free, adding the request pages to one or more of the free lists to thereby make the request pages available for subsequent allocation.

9. The method of claim 1, further including maintaining a set of locks for the respective free lists, and using the lock for a given free list when adding pages to the free list and removing pages from the free list.

10. The method of claim 1, further including:
partitioning the pool memory into a plurality of partitions, each partition maintaining a corresponding set of free lists for a corresponding set of object sizes in the partition;
for each memory-consuming request, first selecting one of the partitions and then performing the allocation operation using the free lists of the selected partition; and
for each memory-freeing request, first identifying the partition containing the request pages and then performing the deallocation operation using the free lists of the identified partition.

11. The method of claim 10, further including maintaining respective sets of locks for the free lists of the respective partitions, and using the lock for a given free list of a given partition when adding pages to the free list and removing pages from the free list of that partition.

12. The method of claim 10, wherein selecting a partition includes randomizing the memory-consuming request to a partition, so as to uniformly distribute memory pool usage among the partitions.

13. The method of claim 12, wherein selecting a partition further includes determining whether a initially selected partition has a free object large enough for the request, and if not then selecting another partition and performing the allocation operation on the selected other partition.

14. The method of claim 12, wherein the data storage system includes a plurality of processing cores employing an asymmetric processing model in which the cores execute respective workloads of different types, and the randomizing is performed across the cores to promote uniform usage of the partitions by the cores.

15. The method of claim 1, further including dynamically adjusting share sizes of respective shares of memory pool designated for the different-size memory objects to enable the share sizes to track real-time changes in an allocation pattern of requests.

16. The method of claim 15, wherein the adjusting is performed by tracking a number of requests of different sizes in predefined time intervals, and reconfiguring the share sizes based on statistics obtained by the tracking.

17. A data storage system comprising data storage devices and processing circuitry, the processing circuitry configured and operative to implement a disk cache using pool memory, the pool memory including an array of pages of a fixed page size, and to manage the pool memory by:
maintaining a set of free lists for a corresponding set of object sizes in the pool memory, the object sizes being corresponding distinct multiples of the fixed page size, each free list identifying corresponding free pages available to store data for memory objects of the corresponding object size;
in response to a memory-consuming request having a request size, performing an allocation operation and storing request data, the allocation operation including (1) selecting a memory object of a size at least as large as the request size and removing all pages of the selected memory object from the corresponding free list, and (2) selecting sufficient pages of the selected memory object to store the request data and marking the selected pages as non-free, and leaving any leftover pages of the selected memory object as free pages; and
in response to a memory-freeing request, performing a deallocation operation including (1) marking the request pages free, and (2) based on sufficient neighboring pages being free, merging the request pages and neighboring pages into a corresponding memory object and adding the merged pages to the corresponding free list.

18. The data storage system of claim 17, wherein the allocation operation further includes adding the leftover pages to one or more of lower-order free lists for object sizes smaller than the selected memory object, thereby making the pages available for subsequent allocation.

19. The data storage system of claim 18, wherein the leftover pages are added to the lower-order free lists in a manner making new objects as large as possible to reduce fragmentation, such that pages are incorporated into new objects of successively smaller sizes as they are being added to the lower-order free lists.

20. The data storage system of claim 17, wherein the deallocation operation further includes checking whether free neighboring pages are linked to corresponding free lists, and if so then unlinking them from the free lists before merging them into the memory object.

* * * * *